March 25, 1930.   F. W. STEERE   1,752,278
GAS MANUFACTURE
Filed April 25, 1925
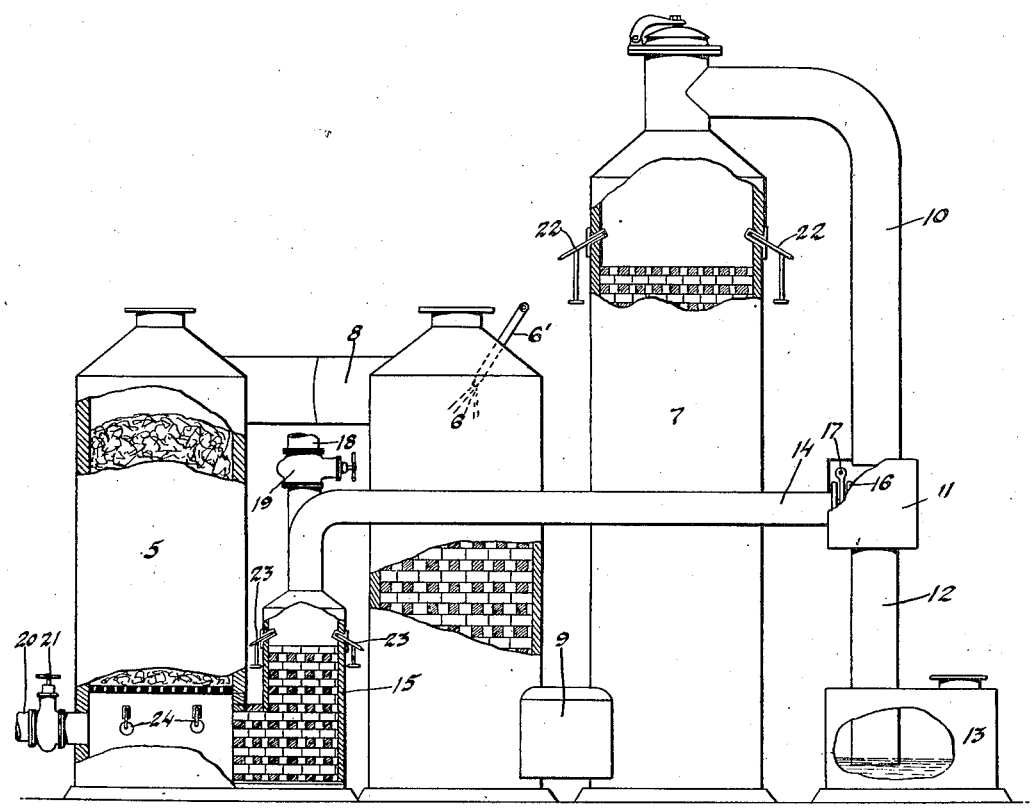
INVENTOR
Frank W. Steere
BY
Hing Harness
ATTORNEY Patented Mar. 25, 1930

1,752,278

UNITED STATES PATENT OFFICE

FRANK W. STEERE, OF HIGHLAND PARK, MICHIGAN, ASSIGNOR, BY MESNE ASSIGNMENTS, TO SEMET-SOLVAY ENGINEERING CORPORATION, OF NEW YORK, N. Y., A CORPORATION OF NEW YORK

GAS MANUFACTURE

Application filed April 25, 1925. Serial No. 25,951.

It is the primary object of my invention to provide a heat storage chamber in close and intimate association with the generator of a water gas set for the purpose of storing heat from "back runs" to assist in generating steam from water in the making of "up runs" and for the further purpose of heating air for blasting.

With the above and other objects in view, my invention consists in the arrangement, combination and construction of the various parts of my improved device as described in the specification, claimed in my claims and shown in the accompanying drawing, in which:

The single figure is an elevation with certain parts broken away showing my invention.

I have shown a water gas generator 5, a carburetor 6 having an inlet 6' for the admission of carbureting material thereto and superheater 7, with the passage 8 joining the generator and carburetor and the passage 9 joining the carburetor and superheater. I have also shown a passage 10 leading from the top of the superheater into a valve housing 11. Connected with the bottom of the valve housing 11 is a passage 12 leading to the washbox or seal 13. Extending laterally from the valve housing 11 is a passage 14 which terminates in the heat storage chamber 15 connected directly with the bottom of the generator 5. A swinging valve 16 is provided in the valve housing 11, being pivoted as at 17, so as to permit it to alternately open and close the passages 10 and 14, as desired.

Communicating with the passage 14 is an air passage 18 having a shut-off valve 19 therein and connected with the bottom of the generator 5 is another air passage 20 having a shut-off valve 21 therein.

I desire it to be understood that my invention may be utilized either in the manufacture of carburetted water gas or in the manufacture of blue water gas, and it follows, therefore, that the carburetor is not an essential part of my invention.

In the practical operation of my improved device, water may be injected into the top of the superheater through the water sprays shown diagrammatically at 22, with the result that the excess heat in the top of the superheater will generate the water into steam and pass it through the bottom of the superheater, the passage 9, the carburetor 6, the passage 8, the generator 5, where the steam reacts with the fuel therein to form water gas which is passed into and through the heat storage chamber 15 and the passage 14, to the washbox 13. In this cycle the valve 16 will be swung on its pivot 17 so as to open the passage 14 and close the passage 10.

It will be noted that the interior of the heat storage chamber 15 is of checker brick construction with the result that a great deal of the heat contained in the gas passing from the generator will be retained in this chamber.

When it is desired to make an "up run", water is directed through the sprays in the heat storage chamber 15, shown diagrammatically at 23, as well as through the sprays in the bottom of the generator shown diagrammatically at 24, with the result that steam will be generated and passed upwardly through the generator where the steam reacts with the fuel therein to form water gas which is passed into and through passage 8, carburetor 6, passage 9, superheater 7, and passage 10 to the washbox 13. In this cycle, the valve 16 will be moved on its pivot 17 so as to close the passage 14 and open the passage 10.

The great amount of heat which is retained by the checker brick in the chamber 15 adds materially to the steam generating efficiency of the set, and provides a cooler gas entering the washbox.

I have shown an air blasting line 20 which may be used for blasting, in which event the valve 19 in the line 18 will be closed. It may be desirable at times, however, to blast through the line 18, and initially heat the air by passing it through the chamber 15, in which event the valve 19 is opened and the valve 21 closed.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. In a water gas set, a single generator, a single carburetor, a single superheater and a seal connected in series, a checkerbrick chamber contiguous to and connected with the base of said generator, a conduit leading from the top of said chamber to the connection between the superheater and seal, a pipe connected to the top of said chamber to supply air thereto, and means to supply water to said chamber.

2. In a water gas set, a single generator, a single carburetor and a single superheater located in separate and detached shells and connected in series, the top of said generator being connected to the top of the carburetor and the base of the carburetor being connected to the base of the superheater, a washbox, a gas offtake leading from the superheater to the washbox, a checkerbrick regenerative chamber located adjacent to and connected with the base of said generator, and a gas conduit leading directly from said checkerbrick chamber to said washbox.

FRANK W. STEERE.